United States Patent
Luo et al.

(10) Patent No.: US 8,654,623 B2
(45) Date of Patent: Feb. 18, 2014

(54) SCRAMBLING UNDER AN EXTENDED PHYSICAL-LAYER CELL IDENTITY SPACE

(75) Inventors: Tao Luo, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1274 days.

(21) Appl. No.: 12/490,829

(22) Filed: Jun. 24, 2009

(65) Prior Publication Data

US 2009/0323957 A1  Dec. 31, 2009

Related U.S. Application Data

(60) Provisional application No. 61/075,610, filed on Jun. 25, 2008.

(51) Int. Cl.
  *H04J 11/00* (2006.01)
  *H04W 4/00* (2009.01)

(52) U.S. Cl.
  USPC .......................... 370/203; 307/328

(58) Field of Classification Search
  USPC ................. 370/203, 328
  See application file for complete search history.

(56) References Cited

U.S. PATENT DOCUMENTS

| | | | |
|---|---|---|---|
| 7,061,890 B2 | 6/2006 | Kim et al. | |
| 2006/0209754 A1 * | 9/2006 | Ji et al. | 370/329 |
| 2007/0298805 A1 | 12/2007 | Basak et al. | |

FOREIGN PATENT DOCUMENTS

| | | | |
|---|---|---|---|
| EP | 0798888 A2 | 10/1997 | |
| EP | 1067730 A1 | 1/2001 | |
| JP | 2002218528 A | 8/2002 | |
| JP | 2003219478 A | 7/2003 | |
| JP | 2006140829 A | 6/2006 | |
| JP | 2008103959 A | 5/2008 | |
| JP | 2008541580 A | 11/2008 | |
| RU | 2232472 C2 | 7/2004 | |
| WO | 2007016933 A1 | 2/2007 | |
| WO | WO 2009082307 * | 7/2009 | ............. H04J 13/02 |

OTHER PUBLICATIONS

Fujii T., et al., "STBC Site Diversity Using Layered Code Assignment for Multicarrier CDMA in Multi-Cell System", Personal, Indoor and Mobile Radio Communications, 2005. PIMRC 2005. IEEE 16th International Symposium on Berlin, Germany Sep. 11-14, 2005, Piscataway, NJ, USA, IEEE, vol. 1, Sep. 11, 2005, pp. 296-300, XP010926458 ISBN: 978-978-38007-2-4 p. 298, section III.
International Search Report and Written Opinion—PCT/US2009/048695—ISA/EPO—Oct. 5, 2009.
Motorola, "Downlink Reference signal sequence design", 3GPP TSG RAN1 on LTE R1-061723, 5.Group Scrambling, URL: http://isearch.3gpp.org/isysquery/c52c4e52-b13d-4ade-8112-49d5dbd13edb/1/doc/R1-061723%20DL%20Pilot Design%20final.Doc, Jun. 27, 2006.
Qualcomm Europe, "Extending the PCI space [online]", 3GPP TSG-RAN WG1#53bis R1-082540, Discussion and Decision, <URL:http://www.3gpp.org/ftp/tsg_ran/WG1_RL1/TSGR1_53b/Docs/R1-082540.zip>, Jun. 25, 2008.
Taiwan Search Report—TW098121438—TIPO—Oct. 18, 2012.

* cited by examiner

*Primary Examiner* — Ronald Abelson
(74) *Attorney, Agent, or Firm* — Anthony R. Morris

(57) ABSTRACT

A method for wireless communications is provided. The method includes determining a set of physical layer cell identities and analyzing a current set of scrambling sequences. The method increases the current set of scrambling sequences to account for increases in the physical layer cell identities.

34 Claims, 11 Drawing Sheets

SCRAMBLING UNDER AN EXTENDED PHYSICAL-LAYER CELL IDENTITY SPACE

CLAIM OF PRIORITY UNDER 35 U.S.C. §119

This application claims the benefit of U.S. Provisional Patent Application No. 61/075,610, entitled IMPROVING SCRAMBLING UNDER AN EXTENDED PHYSICAL-LAYER CELL IDENTITY SPACE, and filed on Jun. 25, 2008, the entirety of which is incorporated herein by reference.

BACKGROUND

I. Field

The following description relates generally to wireless communications systems, and more particularly to mitigating scrambling conflicts in a physical layer cell identity space.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple (NF) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the NF frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Currently, Long Term Evolution (LTE) defines up to 504 unique physical-layer cell identities, achieved by 168 unique physical-layer cell-identity (PCI) groups and 3 unique identities per group. In view of the introduction of home eNodeB operations, additional PCIs may become necessary to differentiate Macro cells and home eNodeBs, for example and to avoid PCI collisions and confusions. For instance, if additional PCI space is added or extended, current scrambling sequences will no longer be unique in the extended space thus causing conflicts and collisions between network nodes.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods provide sequence extensions to existing scrambling sequence generators in order to extend current scrambling sequences, provide unique cell identities within extended physical layer cell identities (PCI), and avoid collisions within extended PCI space. As PCI space is increased (e.g., extended from 504 unique cell identities to 1024 or beyond), scrambling sequences and associated generators are extended to account for the growth of the respective cell identities. Such growth can be added incrementally if desired as future needs require where existing legacy systems (e.g., those associated with the base 504 identities) remain functional and supported in view of the scrambling extensions. In one aspect, extensions to the scrambling sequences are provided as part of an increase in the number of scrambling sequences that are generated. This can include adding exponential factors to available scrambling sequence codes. Such factors provide uniqueness to the respective codes and avoid collisions in PCI space by providing cell identity uniqueness in the extended space. Such extensions can be provided to a plurality of differing sequences including uplink sequences and downlink sequences, where the sequences can be associated with one or more components of network physical layers. In another aspect, extended support is alternatively provided by enabling or selecting options within the sequence to indicate whether the scrambling is for original search space, for extended search space, or beyond. By automatically detecting and selecting the desired space or by increasing the range of existing scrambling codes, cell identity uniqueness is maintained and legacy systems (those using current PCI space) remain supported without modification.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents.

Other advantages and novel features may become apparent from the following detailed description when considered in conjunction with the drawings.

DETAILED DESCRIPTION

Systems and methods are provided to extend scrambling sequences that are employed in extended physical layer cell identity space in a wireless communications system. In one aspect, a method for wireless communications is provided. The method includes employing a processor executing computer executable instructions stored on a computer readable storage medium to implement various acts or processes. The method includes determining a set of physical layer cell identities and analyzing a current set of scrambling sequences. The method increases the current set of scrambling sequences to account for increases in the physical layer cell identities.

Figure 1:
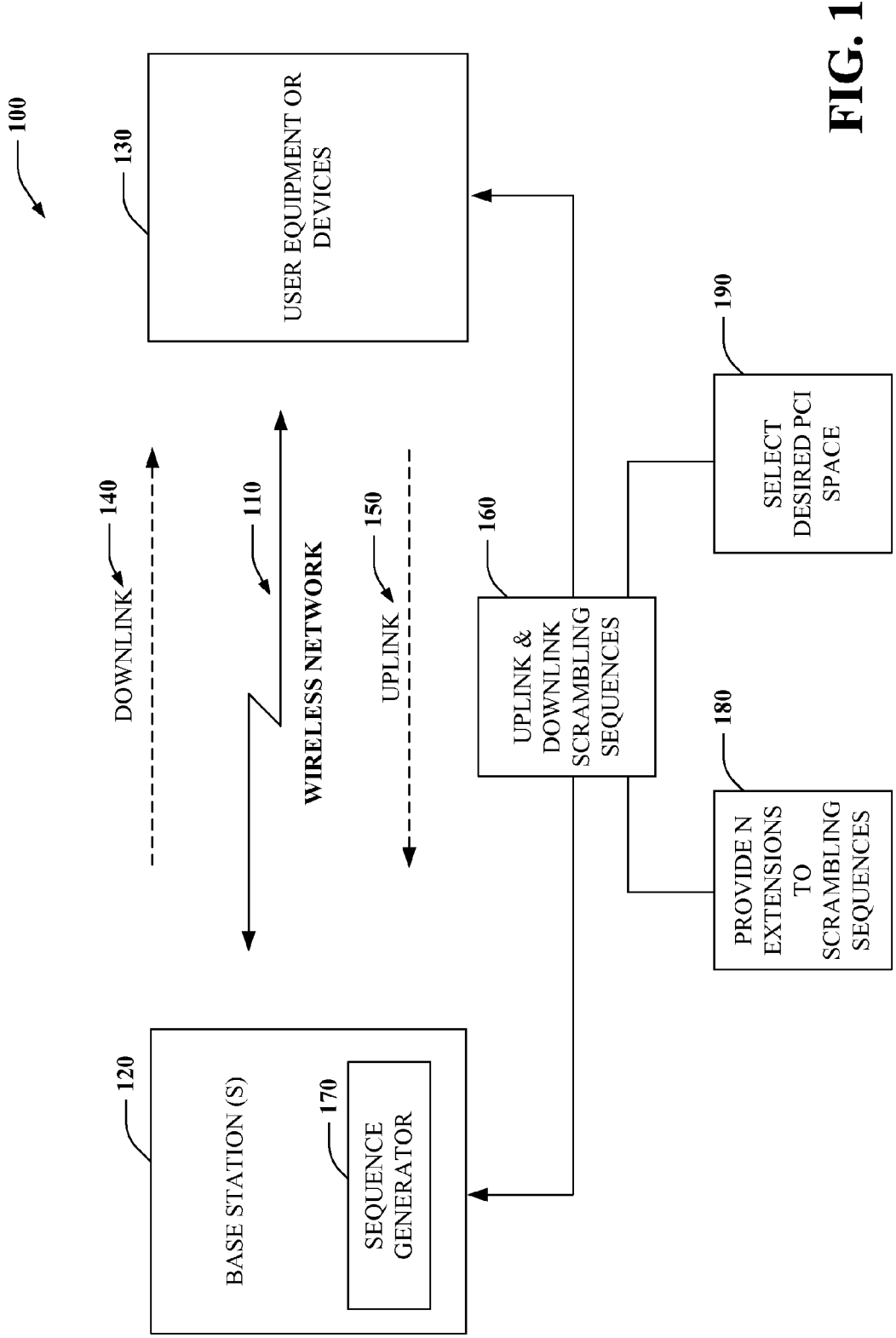
FIG. 1 is a high level block diagram of a system that provides scrambling sequence extensions for extended physical layer cell identity space for a wireless communications system.

Referring now to FIG. 1, a system 100 provides scrambling sequence extensions for extended physical layer cell identity space for a wireless communications system. The system 100 includes one or more base stations 120 (also referred to as a node, evolved node B-eNB, femto station, pico station, and so forth) which can be an entity capable of communication over a wireless network 110 to a second device 130 (or devices). For instance, each device 130 can be an access terminal (also referred to as terminal, user equipment, station or mobile device). The base station 120 communicates to the device 130 via downlink 140 and receives data via uplink 150. Such designation as uplink and downlink is arbitrary as the device 130 can also transmit data via downlink and receive data via uplink channels. It is noted that although two components 120 and 130 are shown on the network 110, that more than two components can be employed, where such additional components can also be adapted for the wireless processing, scrambling, and communication described herein. For instance one or more third party managers could communicate over the network to the base station 120 or user equipment 130.

As shown, sequence extensions 160 are added to existing scrambling sequence generators 170 in order to extend current scrambling sequences, provide unique cell identities within extended physical layer cell identities (PCI), and avoid collisions within extended PCI space. Although not shown, it is to be appreciated that the user equipment 130 or other network devices may also employ sequence generators. As PCI space is increased (e.g., extended from 504 unique cell identities to 1024 or beyond), scrambling sequences 160 and associated generators 170 are extended to account for the growth of the respective cell identities. Such growth can be added incrementally if desired as future needs require where existing legacy systems (e.g., those associated with the base 504 identities) remain functional and supported in view of the scrambling extensions.

In one aspect, extensions to the scrambling sequences 160 are provided at 180 as part of an increase in the number of scrambling sequences that are generated. This can include adding exponential factors to available scrambling sequence codes. Such factors provide uniqueness to the respective codes and avoid collisions in PCI space by providing cell identity uniqueness in the extended space. Such extensions can be provided to a plurality of differing sequences including uplink sequences and downlink sequences, where the sequences can be associated with one or more components of network physical layers which are described in more detail below with respect to FIG. 2.

In another aspect, extended support is alternatively provided at 190 by enabling or selecting options within the sequence to indicate whether the scrambling is for original search space, for extended search space, or beyond. By automatically detecting and selecting the desired space at 190 and/or by increasing the range of existing scrambling codes at 180, cell identity uniqueness is maintained and legacy systems (those using current PCI space) remain supported without modification. It is noted that the scrambling sequences 160 are typically processed via the base stations 120. It is to be appreciated that other configurations are possible. For example, although not shown, the user equipment 130 could also generate one or more sequences. In yet another aspect, a separate network device (not shown) could be employed to generate all or parts of a scrambling sequence. It is further noted that scrambling can occur between stations, between devices and stations, and/or between communications channels associated with a single station.

In another aspect, the system 100 supports various wireless communications processes and methods for generating extended sequences for extended PCI search space. The method includes determining a set of physical layer cell identities and analyzing a current set of scrambling sequences. This includes increasing the current set of scrambling sequences to account for increases in the physical layer cell identities. For instance, the method includes increasing the current set of scrambling sequences by N, where N is an integer and employed as a binary power to raise the number of scrambling sequences in the current set. In another aspect, the method includes increasing the current set by adding an extension element I to the current set of scrambling sequences, where I is an integer and indicates whether to apply the scrambling sequences to the set of physical layer cell identities or to an extended set of physical layer cell identities. This may include adding N bits to a scrambling sequence initialization, where N is an integer and the N bits indicate additional bits due to a physical layer cell identity space increase, where the N bits are linked to an increase in cell identifiers employed in the scrambling sequence initialization.

The N bits can indicate an arrangement of Primary Synchronization Codes (PSC) and Secondary Synchronization Codes (SSC), for example, where if N is set to a value of (1)

for example, then PSC/SSC are swapped in order, if N is set to a value of (0) for example, then PSC/SSC apply in an original order. One or more of the N bits can distributed in differing portions of a scrambling sequence as described in more detail with respect to FIG. 2. The N bits can be applied to a primary reference signal (PRS), a scrambling function, or a hopping function, for example. The method also includes maintaining the current set of scrambling sequences in addition to an extended set of scrambling sequences in order to support legacy systems. In general, the scrambling sequences are associated with a wireless physical layer such as a physical uplink shared channel (PUSCH) or a physical downlink shared channel (PDSCH), for example. Other scrambling sequence extensions can be applied to a physical multicast channel (PMCH), a physical control format indicator channel (PCFICH), a physical downlink control channel (PDCCH), a physical hybrid ARQ indicator channel (PHICH), a downlink cell-specific format, a user equipment-specific format, and/or a multicast broadcast single frequency network (MBSFN) format, for example.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
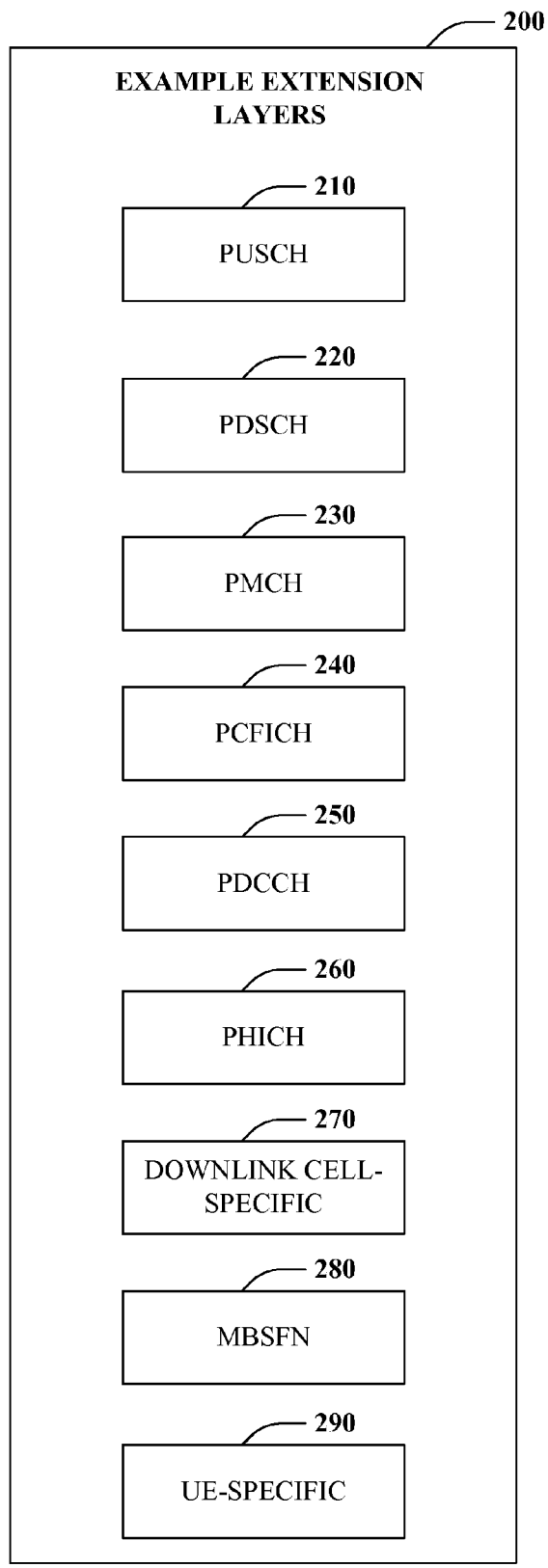
FIG. 2 is a diagram that illustrates example layers and channels that can be employed with extended scrambling sequences for a wireless system.

Referring now to FIG. 2, a diagram 200 illustrates example layers and channels that can be employed with extended scrambling sequences for a wireless system. When the PCI space is extended, e.g., doubled, current initializations of scrambling sequences may have potential conflict issues. For example, 9 scrambling bits may no longer be sufficient to cover all possible cell IDs (e.g., greater than 504). As a result, cells with different IDs may use the same initialization values. Consider the initialization for PUSCH as an example:

$$c_{init} = n_{RNTI} \cdot 2^{14} + \lfloor n_s/2 \rfloor \cdot 2^9 + N_{ID}^{cell} \quad (1)$$

If the PCI space is extended beyond 512 unique identities, e.g., 2*507 for example, 10 bits would be applied to represent these identities. If equation (1) is used under these extended conditions, two cells with IDs $N_1$ and $N_2 \equiv \text{mod}(N_1 + 512, 512)$ will have the same initialization when:

$$n_{s,2} = \text{mod}(n_{s,1} + 1, 32)$$

where $n_{s,i}$, i=1,2, denote the slot number for cell i. In another alternative aspect, when floor (n_{s, 2}/2)=floor (n_{s, 1}/2)−1, if N2>N1, or floor (n_{s, 2}/2)=floor (n_{s, 1}/2)+1, if N2<N1. Note that n_s can have values from 0 to 19, for example.

In order to extend the above sequence depicted in equation 1, a suitable number of bits should be selected to cover the number of possible cell IDs. One solution to the initialization for PUSCH shown at 210 can be such that:

$$c_{init} = n_{RNTI} \cdot 2^{15} + \lfloor n_s/2 \rfloor \cdot 2^{10} + N_{ID}^{cell} \quad (2)$$

where $C_{init}$ is a scrambling initialization sequence, RNTI is Radio Network Temporary Identifier, $n_s$ is slot number, and $N_{ID}^{cell}$ is a cell identification number. Note that equation 1 was modified in two locations (e.g., 2 to the power of 14 became 2 to the power of 15, and 2 to the power of 9 became 2 to the power of 10) by increasing the power of available sequences to account for the increased number of PCI space identities. Other sequence configurations are possible however. For example, in another aspect:

$$c_{init} = n_{RNTI} \cdot 2^{15} + \lfloor n_s/2 \rfloor \cdot 2^{10} + I_{extended} \cdot 2^9 + \text{mod}(N_{ID}^{cell}, 512) \quad (3)$$

Yet another alternative is to use the following:

$$c_{init} = I_{extended} \cdot 2^{30} + n_{RNTI} \cdot 2^{14} + \lfloor n_s/2 \rfloor \cdot 2^9 + \text{mod}(N_{ID}^{cell}, 512) \quad (4)$$

In this manner, the process can be backward compatible, i.e., legacy and new UEs can be supported, where $I_{extended}$ indicates whether $N_{ID}^{cell}$ belongs to the original search space (0) or the extended search space. Extensions to other dimensions of extended PCI space (e.g., tripled, and so forth) are possible. Extensions to other channels are also possible as described below. The following describes possible channels that can be extended. The original scrambling sequences are shown with the example channels or layers where an extension can occur by increasing the power of scrambling possibilities in one or more locations of the scrambling sequences or by adding an extension element such as illustrated above with equation 3.

Currently, scrambling sequences assume up to 504 unique physical-layer cell identities, which can be covered by 9 bits. For instance, the scrambling for PUSCH at 210 can be defined as follows: The scrambling sequence generator shall be initialized with $c_{init} = n_{RNTI} \cdot 2^{14} + \lfloor n_s/2 \rfloor \cdot 2^9 + N_{ID}^{cell}$ at the start of each subframe. As shown above, the PUSCH sequence can be extended by increasing the power within $c_{init}$ as shown in equation 2 above or by adding an extension factor I to the sequence as illustrated in equation 3 above.

Similarly, for downlink traffic: The scrambling sequence generator shall be initialized at the start of each subframe, where the initialization value of $c_{init}$ depends on the transport channel type according to $$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}$$

where PDSCH is illustrated as example layer 220 and PMCH is example layer 230. As noted previously, these layers/sequences can be extended as similar to the PUSCH layer described above. For instance, an I extended factor could be added to the PDSCH equation similar to equation 3 above or the factors 2 to the power of 14 and two to the power of 9 in the PDSCH equation could be increased accordingly as PCI space is increased. The following layers show the current or original scrambling sequences. As can be appreciated, each of the example sequences can be similarly extended as illustrated above with respect to equations 2 and 3, respectively. It is to be appreciated that scrambling extensions can be applied to other layers than the example layers shown in FIG. 2.

For PCFICH 240:
The scrambling sequence generator can be initialized with $c_{init}=(\lfloor n_s/2 \rfloor+1)\cdot(2N_{ID}^{cell}+1)\cdot 2^{19}+N_{ID}^{cell}$ at the start of each subframe for legacy systems.

For PDCCH 250:
The scrambling sequence generator can be initialized with $c_{init}=\lfloor n_s/2 \rfloor 2^9+N_{ID}^{cell}$ at the start of each subframe.

For PHICH 260:
The scrambling sequence generator can be initialized with $c_{init}=(\lfloor n_s/2 \rfloor+1)\cdot(2N_{ID}^{cell}=1)\cdot 2^{19}=N_{ID}^{cell}$ at the start of each subframe.

For Downlink Cell-specific reference signals at 270:
The pseudo-random sequence generator can be initialized with
$c_{init}=2^{10}\cdot(7\cdot(n_s+1)+l+1)\cdot(2\cdot N_{ID}^{cell}+1)+2\cdot N_{ID}^{cell}+N_{CP}$ at the start of each OFDM symbol where $$N_{CP} = \begin{cases} 1 & \text{for normal } CP \\ 0 & \text{for extended } CP \end{cases}$$

For MBSFN reference signals 280:
The pseudo-random sequence generator can be initialized with
$c_{init}=2^9\cdot(7\cdot(n_s+1)+l+1)\cdot(2N_{ID}^{MBSFN}+1)+N_{ID}^{MBSFN}$ at the start of each OFDM symbol.

For UE-specific reference signals at 290:
The pseudo-random sequence generator can be initialized with
$c_{init}=(\lfloor n_s/2 \rfloor+1)\cdot(2N_{ID}^{cell}+1)\cdot 2^{16}+n_{RNTI}$ at the start of each subframe. As noted previously, each of the original sequences 220 290 described herein can be similarly extended as described above with respect to equations 2 and 3 for the PUSCH layer.

Figure 3:
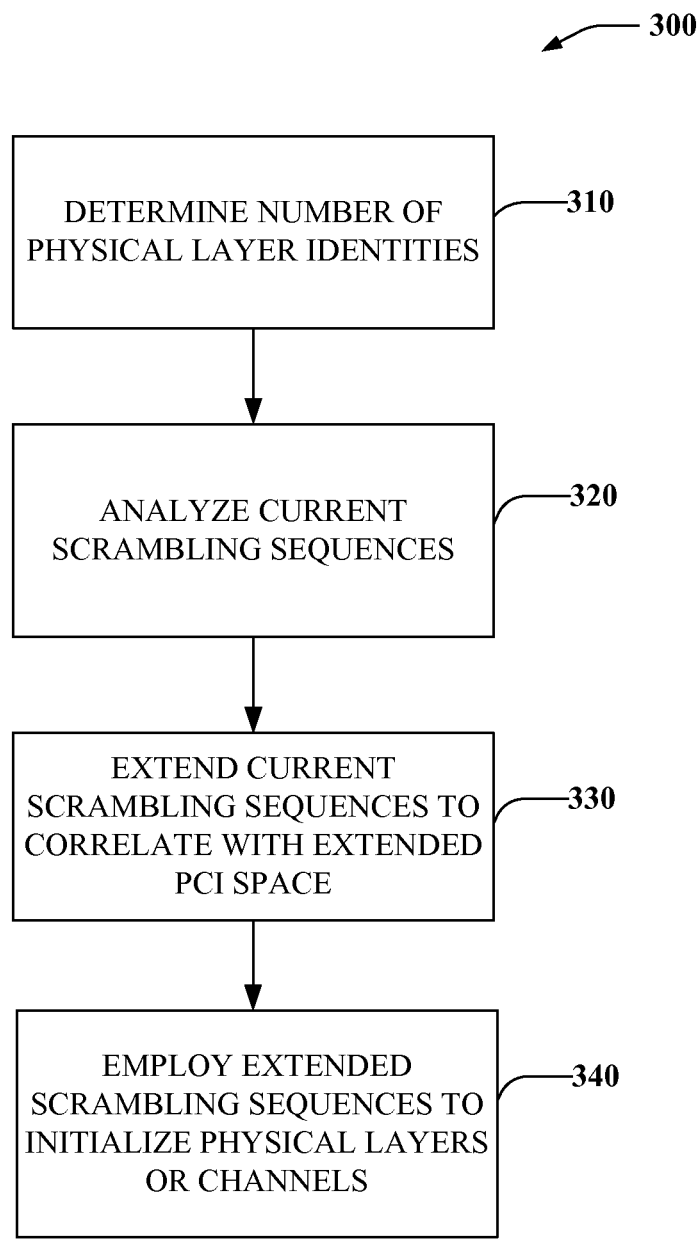
FIG. 3 is a flow diagram of an example scrambling sequence extension process for a wireless communication system.
Figure 4:
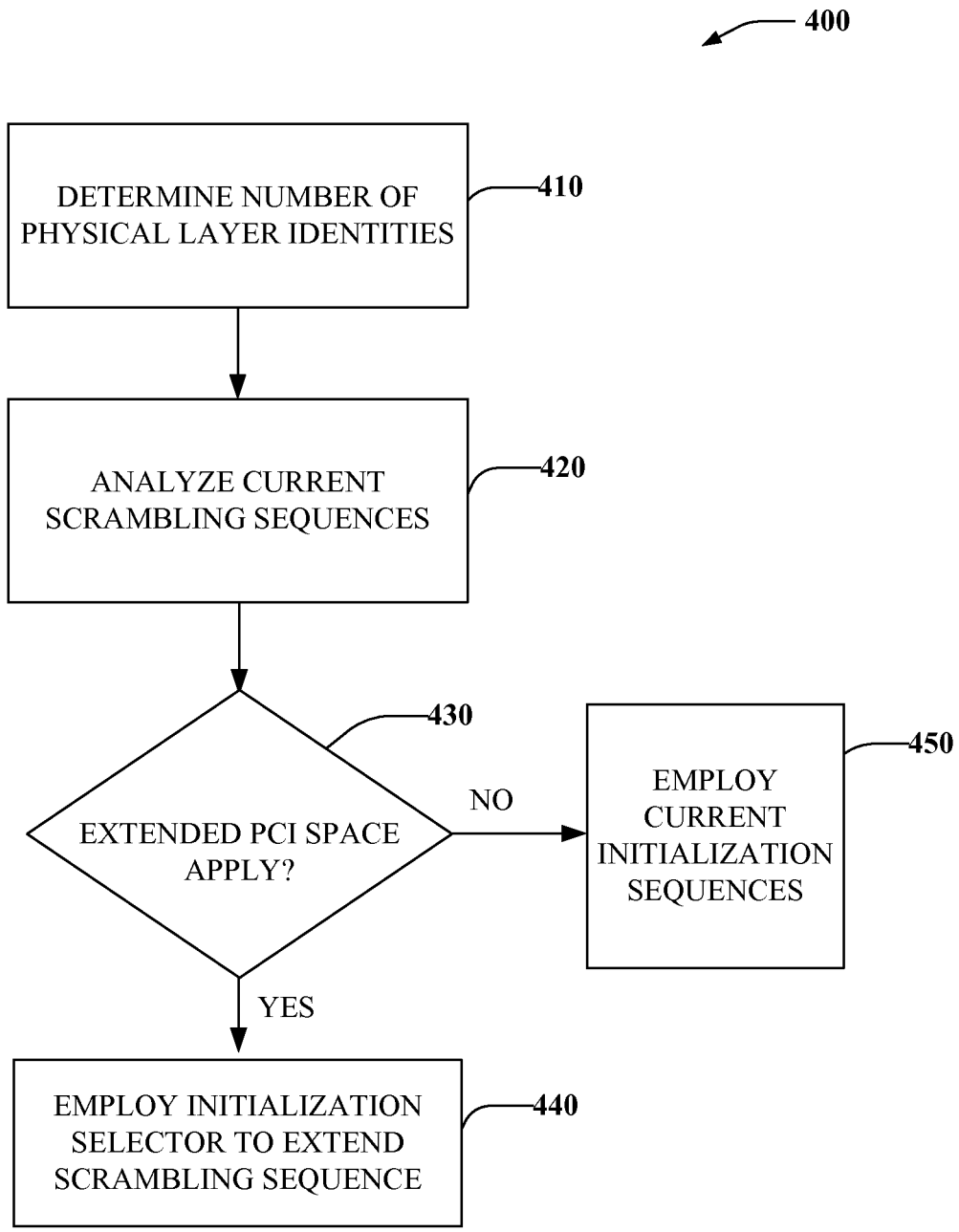
FIG. 4 is a flow diagram of an alternative sequence extension process for a wireless communication system.
Figure 5:
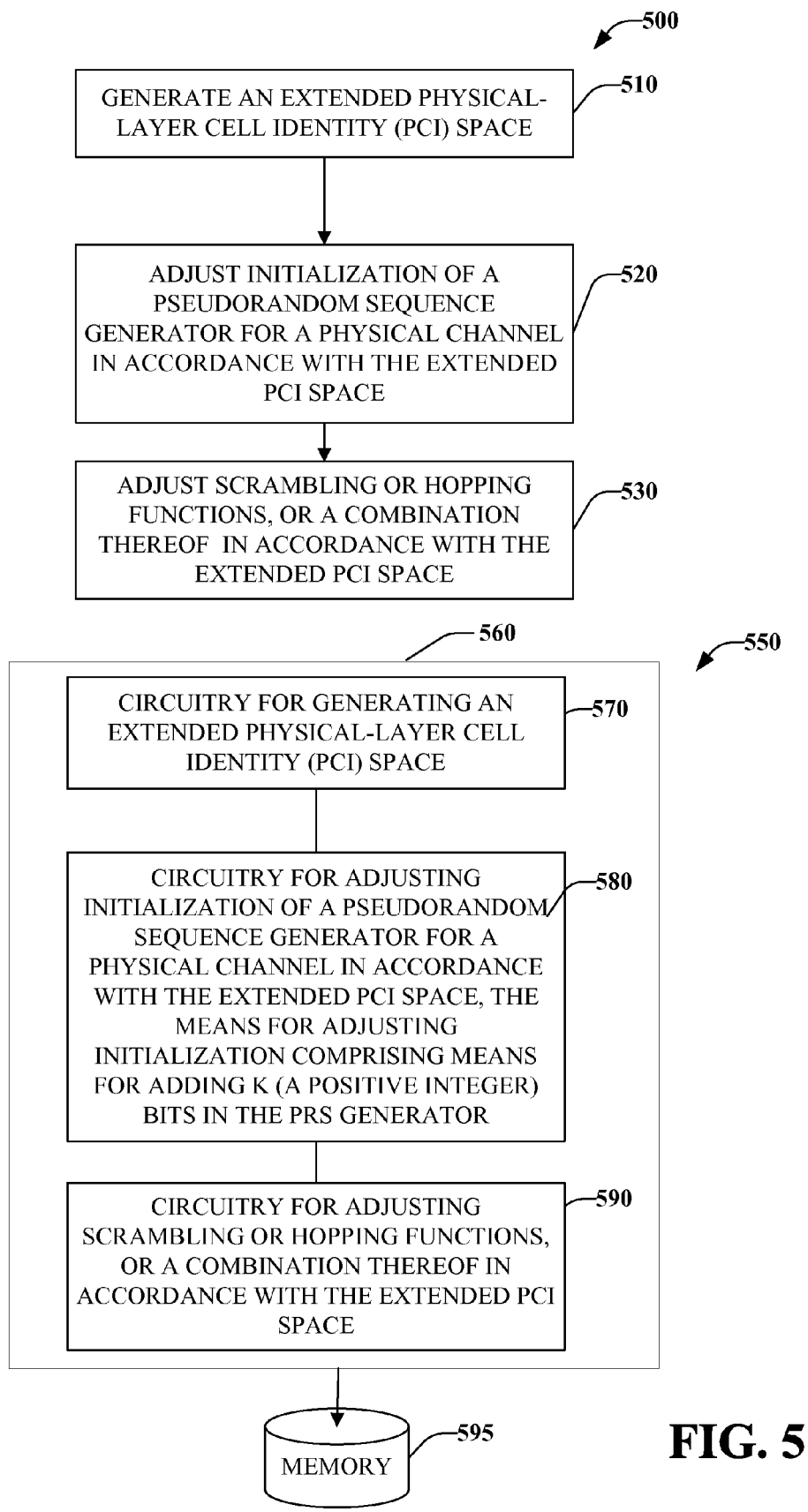
FIG. 5 is a flow diagram of alternative sequence generators and processes for a wireless communications system.

Referring now to FIGS. 3-5, wireless communications methodologies are illustrated. While, for purposes of simplicity of explanation, the methodologies (and other methodologies described herein) are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the process in FIGS. 3-5 improves the probability of handover messages being received by user equipment with minimum delay. This includes shorter stalls or delays during handover between nodes or devices, which can improve end user experience, especially with real-time delay sensitive services where handover outages are unacceptable.

FIG. 3 is an example scrambling sequence extension process 300 for a wireless communication system. At 310, a number of physical layer identities (PCI) are determined. As noted previously, current specifications provide for 504 identities, whereas extended architectures can increase by double, triple, quadruple, and so forth. At 320, current scrambling sequences are analyzed. This includes analyzing how many unique scrambling sequences can be generated with a current generator form. At 330, current scrambling sequences are extended to correlate with the PCI space identities determined at 310. This can include raising the power of one or more factors within a given generator sequence in order to provide a unique sequence or code for a respective identity. At 340, the extended scrambling sequences are employed to initialize various physical layers or channels. As noted previously, some example layers include a wireless physical layer such as a physical uplink shared channel (PUSCH) or a physical downlink shared channel (PDSCH), for example. Other scrambling sequence extensions can be applied to a physical multicast channel (PMCH), a physical control format indicator channel (PCFICH), a physical downlink control channel (PDCCH), a physical hybrid ARQ indicator channel (PHICH), a downlink cell-specific format, a user equipment-specific format, and/or a multicast broadcast single frequency network (MBSFN) format, for example.

FIG. 4 is an alternative sequence extension process 400 for a wireless communication system. In this aspect, similar to acts 310 and 320 above, at act 410, a number of physical layer identities (PCI) are determined. At 420, current scrambling sequences are analyzed. This includes analyzing how many unique scrambling sequences can be generated with a current generator form or format. At 430, a determination is made as to whether or not extended PCI space is applied or is to be employed. If extended PCI space is required at 430, the process proceeds to 440 where an initialization selector I is employed, where I is an integer value that enables unique scrambling codes to be generated for the extended PCI space. If extended PCI space does not apply at 430, then, at 450, current initialization sequences (e.g., those for the 504 identity space) can be utilized.

FIG. 5 illustrates alternative processes and components for a wireless communications system. A method 500 for improving scrambling under an extended physical-layer cell identity space is provided. At 510, an extended physical-layer cell identity (PCI) space is generated. In an aspect, generation includes doubling the number of scrambling codes available for PSC and SSC. In another aspect, a PCI space can be tripled, quadrupled, and so forth, based at least in part on a number of home eNode Bs and a tradeoff between gains in quality of service through mitigation of PCI collisions and processing complexity. At 520, initialization of a pseudorandom sequence generation for a channel in a wireless system, e.g., a 3GPP LTE system, is adjusted in accordance with the extended PCI space. In an aspect, adjustment includes adding K bits (K an integer) to span substantially all unique identities in the extended PCI; for instance, K=1 can be utilized when PCI space is doubled from 504 unique scrambling codes to 1008 scrambling codes. It should also be appreciated that for non-random sequences (e.g., Zadoff-Chu sequences or polyphase sequences in general) cell ID can be utilized for sequence selection by tying a sequence index to a value of $N_{ID}^{cell}$; thus proper adjustment of cell ID to ensure unique identifiers in the PCI space can be utilized for proper initialization, e.g., avoiding sequence collision. At 530, scrambling function(s) or hopping function(s) or a combination thereof, are adjusted in accordance with the extended PCI space. For example, when hopping functions are tied to a cell index $N_{ID}^{cell}$, the cell index is to be suitably determined in view of the extended PCI space in order to mitigate repeated hopping function arising from repeated cell IDs.

Next, a system 550 that can enable aspects of the disclosed subject matter is provided. Such a system 550 can include functional blocks, which can be functional blocks that represent functions implemented by a processor or an electronic machine, software, or combination thereof (e.g., firmware).

The system 550 enables improving scrambling under an extended physical-layer cell identity space in accordance with aspects described herein. The system 550 can reside, at least partially, within a mobile device. System 550 includes a logical grouping 560 of circuitry that can act in conjunction. In an aspect, logical grouping 560 includes circuitry 570 for generating an extended physical-layer cell identity (PCI) space; circuitry 580 for adjusting initialization of a pseudo-random sequence (PRS) generator for a physical channel in accordance with the extended PCI space, the means for adjusting initialization comprising means for adding K (a positive integer) bits in the PRS generator; and circuitry 590 for adjusting scrambling or hopping functions, or a combination thereof, in accordance with the extended PCI space.

The system 550 can also include a memory 595 that retains instructions for executing functions associated with electrical components 570, 580, and 590, as well as measured or computed data that may be generated during executing such functions. While shown as being external to memory 595, it is to be understood that one or more of electronic components 570, 580, and 590 can exist within memory 595.

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
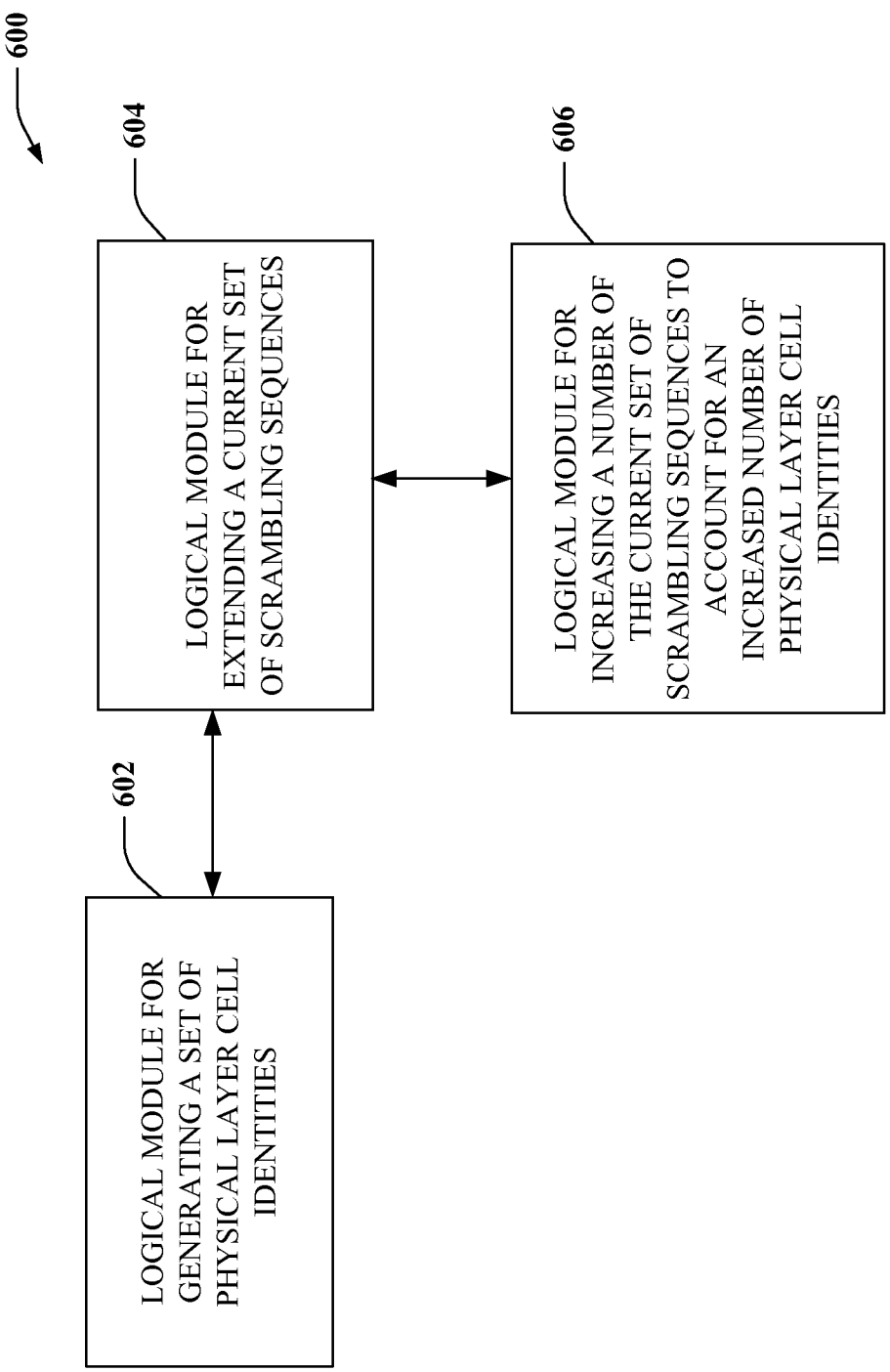
FIG. 6 illustrates an example logical module for scrambling sequence extensions.
Figure 7:
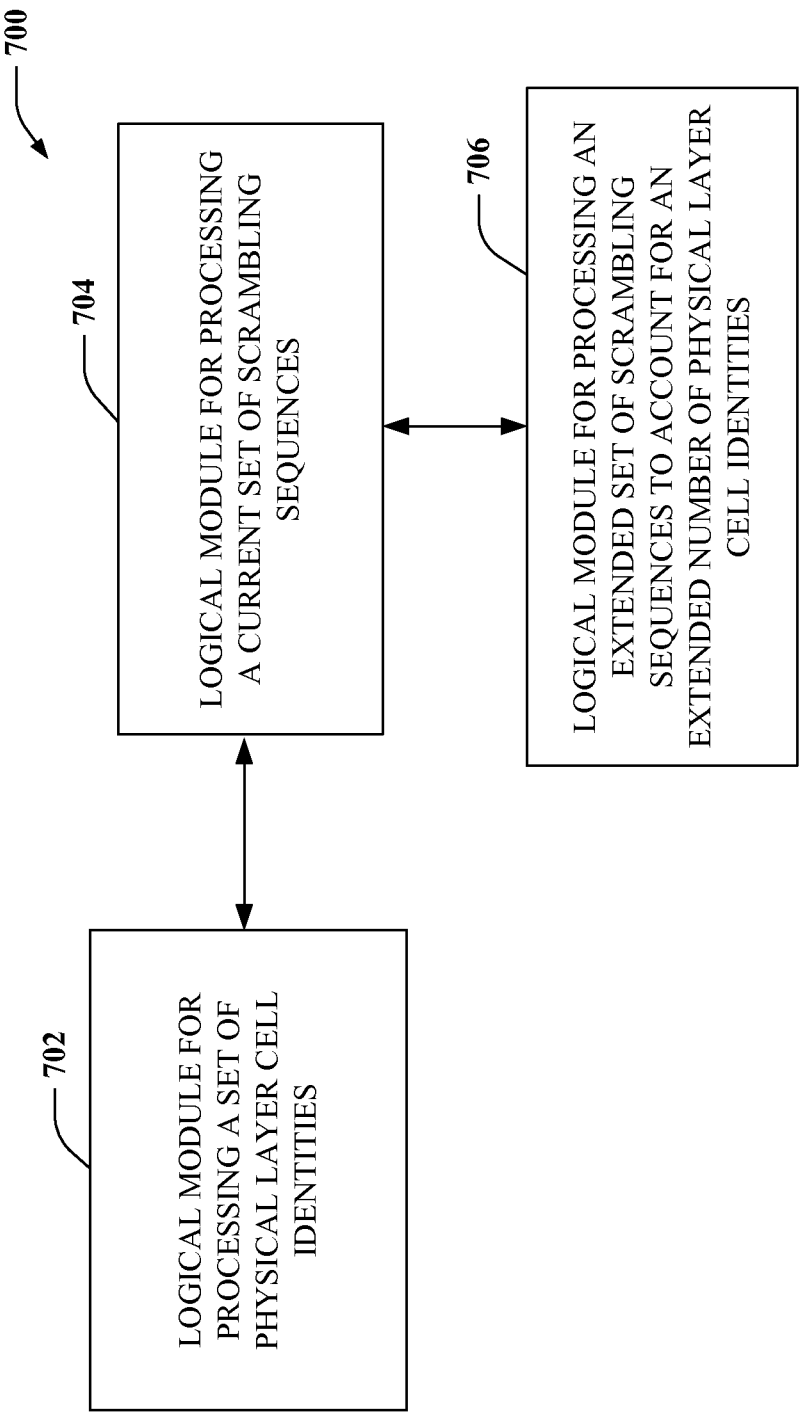
FIG. 7 illustrates an example logical module for alternative scrambling sequence extensions.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 or means for generating a set of physical layer cell identities and a logical module 604 or means for extending a current set of scrambling sequences. The system 600 also includes a logical module 606 or means for increasing a number of the current set of scrambling sequences to account for an increased number of physical layer cell identities.

Referring to FIG. 7, a wireless communication system 700 is provided. The system 700 includes a logical module 702 or means for processing a set of physical layer cell identities and a logical module 704 or means for processing a current set of scrambling sequences. The system 700 also includes a logical module 706 or means for processing an extended set of scrambling sequences to account for an extended number of physical layer cell identities.

In one aspect, a method for wireless communications is provided. The method includes determining a set of physical layer cell identities; analyzing a current set of scrambling sequences; and increasing the current set of scrambling sequences to account for increases in the physical layer cell identities. The method includes increasing the current set of scrambling sequences by N, where N is an integer and employed as a binary power to raise the number of scrambling sequences in the current set. The method also include increasing the current set by adding an extension element I to the current set of scrambling sequences, where I is an integer and indicates whether to apply the scrambling sequences to the set of physical layer cell identities or to an extended set of physical layer cell identities. This includes adding N bits to a scrambling sequence initialization, where N is an integer and the N bits indicate additional bits due to a physical layer cell identity space increase, where the N bits are linked to an increase in cell identifiers employed in the scrambling sequence initialization.

The N bits can indicate an arrangement of Primary Synchronization Codes (PSC) and Secondary Synchronization Codes (SSC), where if N is set to a value of (1), then PSC/SSC are swapped in order, if N is set to a value of (0), then PSC/SSC apply in an original order. One or more of the N bits are distributed in differing portions of a scrambling sequence and are applied to a primary reference signal (PRS), a scrambling function, or a hopping function. The method includes maintaining the current set of scrambling sequences in addition to an extended set of scrambling sequences in order to support legacy systems. The scrambling sequences are associated with a wireless physical layer including a physical uplink shared channel (PUSCH) or a physical downlink shared channel (PDSCH). The scrambling sequences are associated with a physical multicast channel (PMCH) or a physical control format indicator channel (PCFICH). These are also associated with a physical downlink control channel (PDCCH) or a physical hybrid ARQ indicator channel (PHICH). The scrambling sequences are also associated with a downlink cell-specific format, a user equipment-specific format, or a multicast broadcast single frequency network (MBSFN) format.

In another aspect, a communications apparatus is provided that includes a memory that retains instructions for determining a set of physical layer cell identities, generating a current set of scrambling sequences, and automatically increasing the current set of scrambling sequences to account for increases in the physical layer cell identities; and a processor that executes the instructions.

In yet another aspect, a computer program product is provided. This includes a computer-readable medium that includes code for extending scrambling sequences, the code comprising: code for causing a computer to generate a set of physical layer cell identities; code for causing a computer to extend a current set of scrambling sequences; and code for causing a computer to increase a number of the current set of scrambling sequences to account for a number of physical layer cell identities.

In another aspect a processor that executes the following instructions includes: processing a set of physical layer cell identities; extending a current set of scrambling sequences; and increasing a number of the current set of scrambling sequences to account for a number of physical layer cell identities.

In another aspect, a method for wireless communications includes: processing a set of physical layer cell identities; processing a current set of scrambling sequences; and receiving an extended set of scrambling sequences to account for increases in the physical layer cell identities.

In yet another aspect, a communications apparatus includes: a memory that retains instructions for determining a set of physical layer cell identities, processing a current set of scrambling sequences, and processing an extended set of scrambling sequences to account for increases in the physical layer cell identities; and a processor that executes the instructions.

In another aspect, a computer program product includes code for causing a computer to process a set of physical layer cell identities; code for causing a computer to extend a current set of scrambling sequences; and code for causing a computer to process a number of extended scrambling sequences to account for a number of extended physical layer cell identities.

In another aspect, a processor executes the following instructions: processing a set of physical layer cell identities; extending a current set of scrambling sequences; and processing an extended number of scrambling sequences to account for an extended number of physical layer cell identities. This can include processing an instruction, computing a factor to a raised power, or performing a select operation between computing factors. The factors include an extension integer, an extension sequence, an instruction, means for extending further, a raised power factor, a selection element, or selection instruction.

Figure 8:
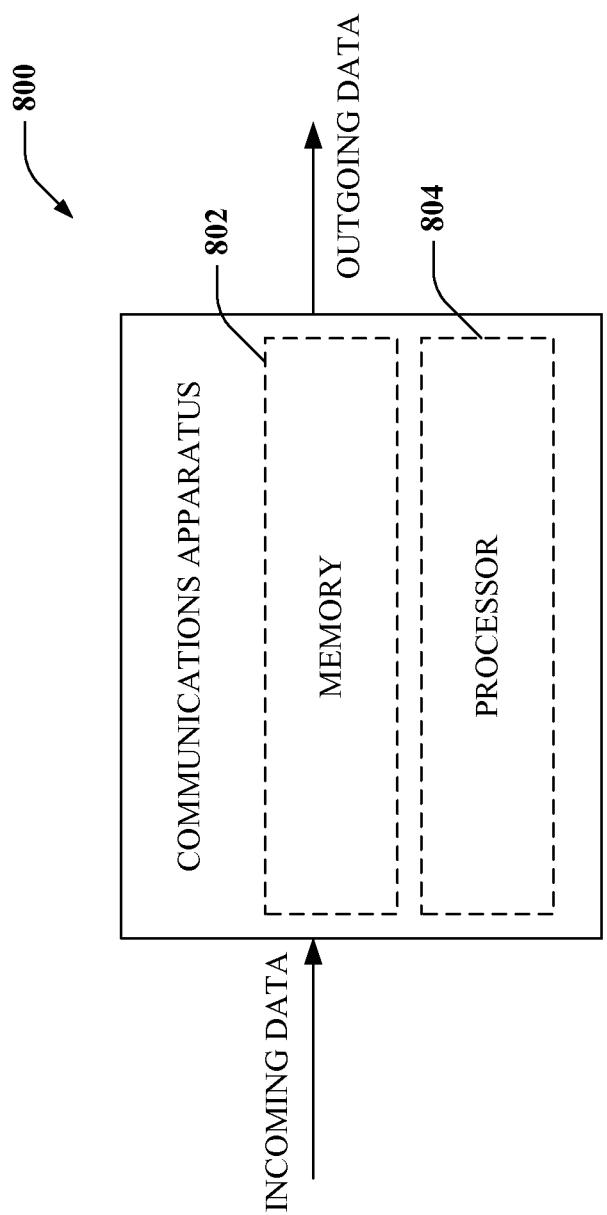
FIG. 8 illustrates an example communications apparatus that employ scrambling sequence extensions.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
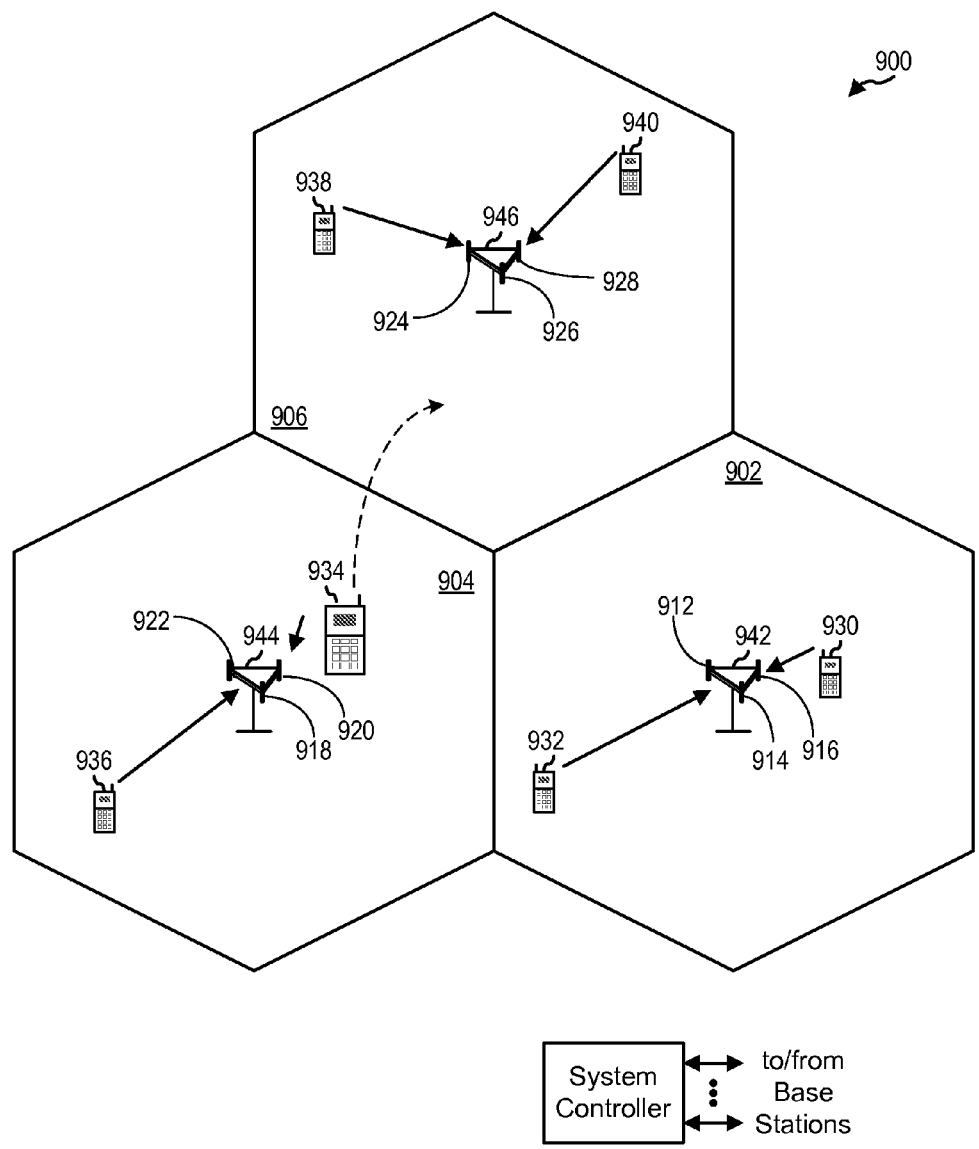
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
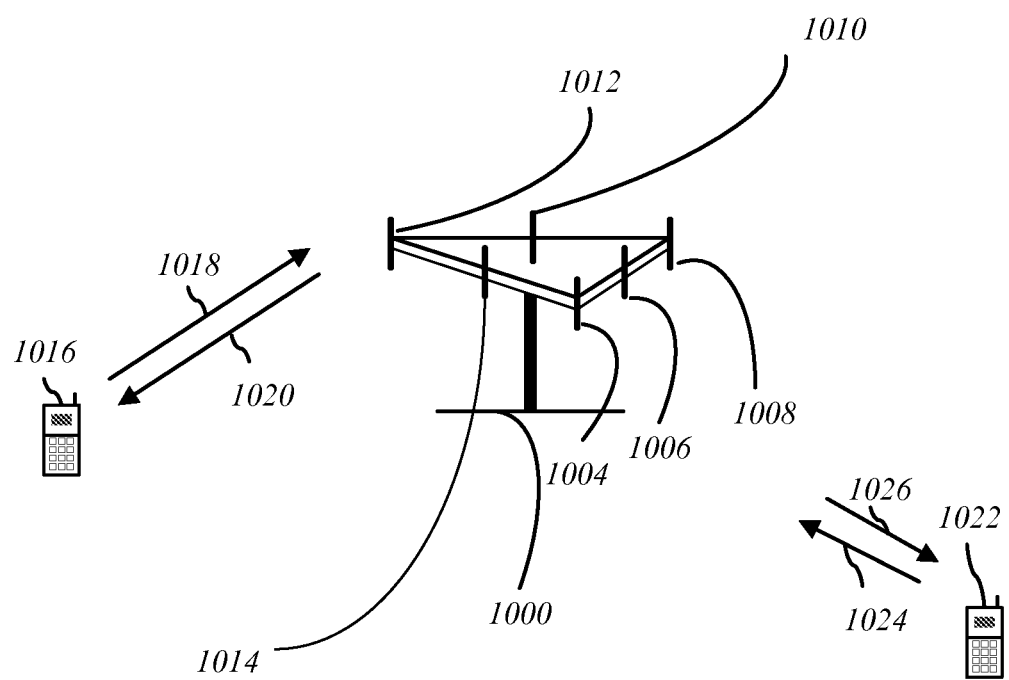
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1022. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
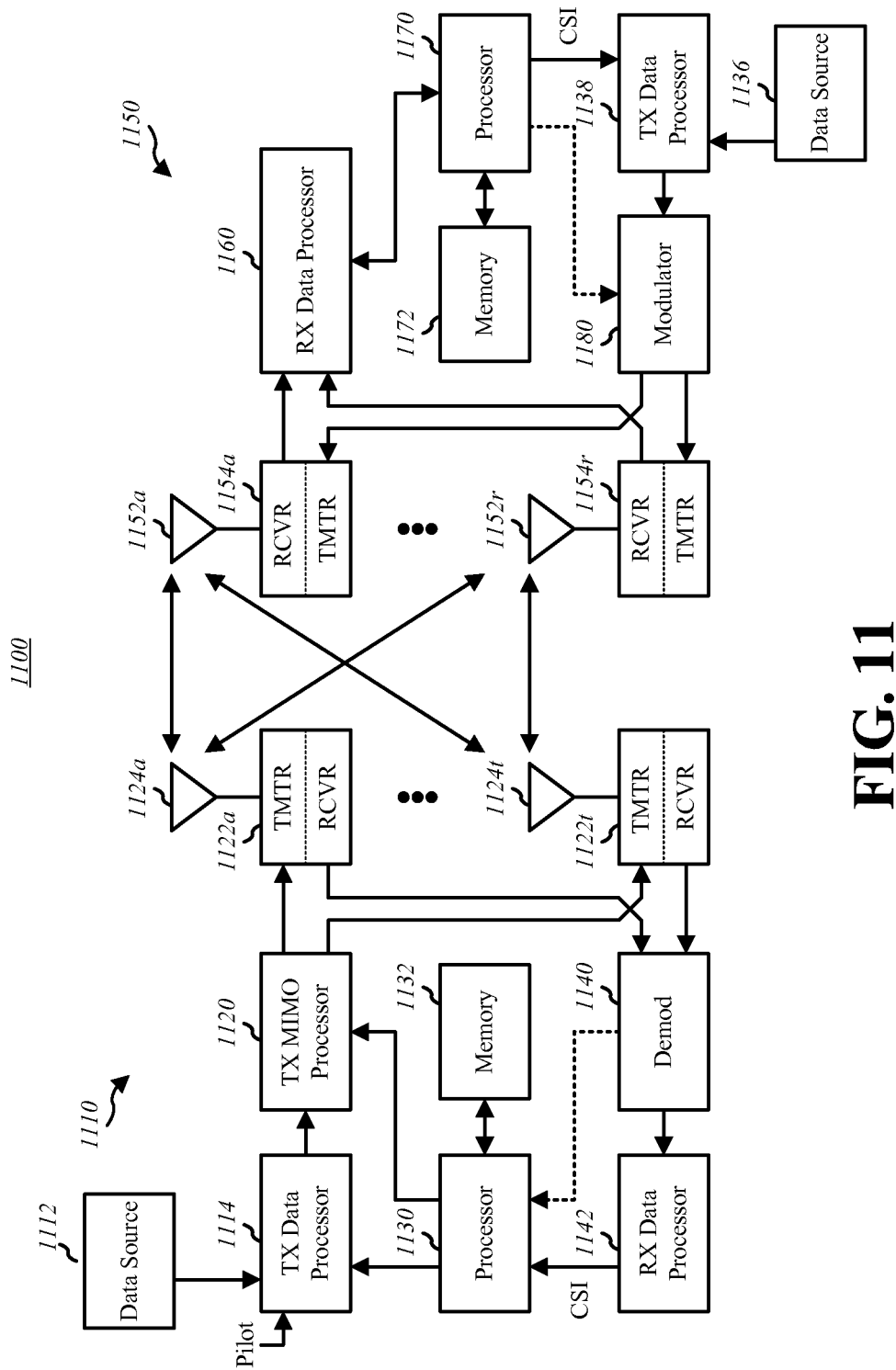

Referring to FIG. 11, a system 1100 illustrates a transmitter system 1110 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
   determining a set of physical layer cell identities;
   analyzing a current set of scrambling sequences; and
   increasing the current set of scrambling sequences to account for increases in the physical layer cell identities by adding an extension element I to the current set of scrambling sequences, where I is an integer and indicates whether to apply the scrambling sequences to the set of physical layer cell identities or to an extended set of physical layer cell identities.

2. The method of claim 1, further comprising increasing the current set of scrambling sequences by N, where N is an integer and employed as a binary power to raise the number of scrambling sequences in the current set.

3. The method of claim 1, further comprising adding N bits to a scrambling sequence initialization, where N is an integer and the N bits indicate additional bits due to a physical layer cell identity space increase.

4. The method of claim 3, wherein the N bits are linked to an increase in cell identifiers employed in the scrambling sequence initialization.

5. The method of claim 4, wherein the N bits indicate an arrangement of Primary Synchronization Codes (PSC) and Secondary Synchronization Codes (SSC).

6. The method of claim 5, wherein if N is set to a value of (1), then PSC/SSC are swapped in order, and if N is set to a value of (0), then PSC/SSC apply in an original order.

7. The method of claim 5, wherein one or more of the N bits are distributed in differing portions of a scrambling sequence.

8. The method of claim 5, wherein the N bits are applied to a primary reference signal (PRS), a scrambling function, or a hopping function.

9. The method of claim 1, further comprising maintaining the current set of scrambling sequences in addition to an extended set of scrambling sequences in order to support legacy systems.

10. The method of claim 1, wherein the scrambling sequences are associated with a wireless physical layer.

11. The method of claim 1, wherein the scrambling sequences are associated with a physical uplink shared channel (PUSCH) or a physical downlink shared channel (PDSCH).

12. The method of claim 1, wherein the scrambling sequences are associated with a physical multicast channel (PMCH) or a physical control format indicator channel (PCFICH).

13. The method of claim 1, wherein the scrambling sequences are associated with a physical downlink control channel (PDCCH) or a physical hybrid ARQ indicator channel (PHICH).

14. The method of claim 1, wherein the scrambling sequences are associated with a downlink cell-specific format, a user equipment-specific format, or a multicast broadcast single frequency network (MBSFN) format.

15. A communications apparatus, comprising:
a memory that retains instructions for determining a set of physical layer cell identities, generating a current set of scrambling sequences, and automatically increasing the current set of scrambling sequences to account for increases in the physical layer cell identities by adding an extension element I to the current set of scrambling sequences, where I is an integer and indicates whether to apply the scrambling sequences to the set of physical layer cell identities or to an extended set of physical layer cell identities; and
a processor that executes the instructions.

16. The communications apparatus of claim 15, the memory further retains an instruction to increase the current set of scrambling sequences by N, where N is an integer and employed as a binary power to raise the number of scrambling sequences in the current set.

17. The communications apparatus of claim 15, the memory further retains an instruction for adding bits that indicate Primary Synchronization Codes (PSC) and Secondary Synchronization Codes (SSC).

18. The communications apparatus of claim 15, wherein the scrambling sequences are associated with a wireless physical layer, a channel, or a device.

19. A communications apparatus, comprising:
means for determining a set of physical layer cell identities;
means for analyzing a current set of scrambling sequences; and
means for increasing the current set of scrambling sequences to account for increases in the physical layer cell identities by adding an extension element I to the current set of scrambling sequences, where I is an integer and indicates whether to apply the scrambling sequences to the set of physical layer cell identities or to an extended set of physical layer cell identities.

20. The communications apparatus of claim 19, the means for increasing further comprising means for increasing the current set of scrambling sequences by N, where N is an integer and employed as a binary power to raise the number of scrambling sequences in the current set.

21. A computer program product comprising:
a computer-readable medium that includes code for extending scrambling sequences, the code comprising:
code for causing a computer to generate a set of physical layer cell identities;
code for causing a computer to extend a current set of scrambling sequences;
code for causing a computer to employ an extension integer to select the current set of scrambling sequences or an extended set of scrambling sequences; and
code for causing a computer to increase a number of the current set of scrambling sequences to account for a number of physical layer cell identities.

22. The computer program product of claim 21, further comprising an extension sequence that employs a raised power factor to increase the number of the current set of scrambling sequences.

23. A processor that executes the following instructions:
generating a set of physical layer cell identities;
extending a current set of scrambling sequences;
employing an extension integer to select the current set of scrambling sequences or an extended set of scrambling sequences; and
increasing a number of the current set of scrambling sequences to account for a number of physical layer cell identities.

24. The processor of claim 23, further comprising a selection element to automatically increase scrambling sequence identities.

25. A method for wireless communications, comprising:
processing a set of physical layer cell identities;
processing a current set of scrambling sequences by adding an extension element I to the current set of scrambling sequences, where I is an integer and indicates whether to apply the scrambling sequences to the set of physical layer cell identities or to an extended set of physical layer cell identities; and
processing an extended set of scrambling sequences to account for increases in the physical layer cell identities.

26. The method of claim 25, further comprising processing the current set of scrambling sequences by N, where N is an integer and employed as a binary power to raise the number of scrambling sequences in the current set.

27. A communications apparatus, comprising:
a memory that retains instructions for:
determining a set of physical layer cell identities;
processing a current set of scrambling sequences;
increasing the current set by adding an extension element I to the current set of scrambling sequences, where I is an integer and indicates whether to apply the scrambling sequences to the set of physical layer cell identities or to an extended set of physical layer cell identities; and
processing an extended set of scrambling sequences to account for increases in the physical layer cell identities; and
a processor that executes the instructions.

28. The communications apparatus of claim 27, the memory further retains an instruction to increase the current set of scrambling sequences by N, where N is an integer and employed as a binary power to raise the number of scrambling sequences in the current set.

29. A communications apparatus, comprising:
means for processing a set of physical layer cell identities;
means for processing a current set of scrambling sequences;
means for increasing the current set by adding an extension element I to the current set of scrambling sequences, where I is an integer and indicates whether to apply the scrambling sequences to the set of physical layer cell identities or to an extended set of physical layer cell identities; and
means for processing an extended set of scrambling sequences to account for an extended number of physical layer cell identities.

30. The communications apparatus of claim 29, further comprising means for increasing the current set of scrambling sequences by N, where N is an integer and employed as a binary power to raise the number of scrambling sequences in the current set.

31. A computer program product comprising:
a computer-readable medium that includes code for extending scrambling sequences, the code comprising:
code for causing a computer to process a set of physical layer cell identities;
code for causing a computer to extend a current set of scrambling sequences;

code for causing a computer to employ an extension integer to select the current set of scrambling sequences or an extended set of scrambling sequences; and code for causing a computer to process a number of extended scrambling sequences to account for a number of extended physical layer cell identities.

32. The computer program product of claim 31, further comprising an extension sequence that employs a raised power factor to increase the number of the current set of scrambling sequences.

33. A processor that executes the following instructions:
processing a set of physical layer cell identities;
extending a current set of scrambling sequences;
employing an extension integer to select the current set of scrambling sequences or an extended set of scrambling sequences; and
processing an extended number of scrambling sequences to account for an extended number of physical layer cell identities.

34. The processor of claim 33, further comprising a selection instruction to automatically increase scrambling sequence identities.

\* \* \* \* \*